Feb. 6, 1940.    J. O. EDSON    2,189,546

TRANSMISSION SYSTEM

Filed Oct. 22, 1938

INVENTOR
J. O. EDSON
BY
R. J. Fluskey
ATTORNEY

Patented Feb. 6, 1940

2,189,546

UNITED STATES PATENT OFFICE 2,189,546

TRANSMISSION SYSTEM

James O. Edson, Great Kills, N. Y., assignor to Bell Telephone Laboratories, Incorporated, New York, N. Y., a corporation of New York Application October 22, 1938, Serial No. 236,569

5 Claims. (Cl. 175—363)

This invention relates to transmission systems and, more particularly, to a rectifying system or circuit including an electron discharge device.

There is a need, particularly in measuring systems where high accuracy is essential, for a rectifying device, system or circuit including an electron discharge device in which the output of the rectifying arrangement faithfully reflects the variations in the input to the rectifying arrangement and which is insensitive to or independent of the characteristics of the discharge device.

An object of this invention is to satisfy this need.

A feature of this invention comprises a rectifying system in which the output voltage faithfully reflects the variations in the input voltage and which is substantially insensitive to or independent of the characteristic of the discharge device.

Another feature comprises operating an electron discharge device having a control grid, cathode and anode, with the control grid biased to such a positive potential that the voltage drop across the cathode-anode space for peak voltage input is small compared to the voltage developed across a load in the output, and so small that appreciable variations in its magnitude are possible with a negligible effect only on the developed voltage.

A further feature comprises a rectifying system embodying such features and including means for neutralizing to a preassigned extent the developed voltage so that there appears at the output terminals of the system only the voltage difference between the load voltage and neutralizing voltage that reflects the variations in the voltage input to the system.

Figure 1:
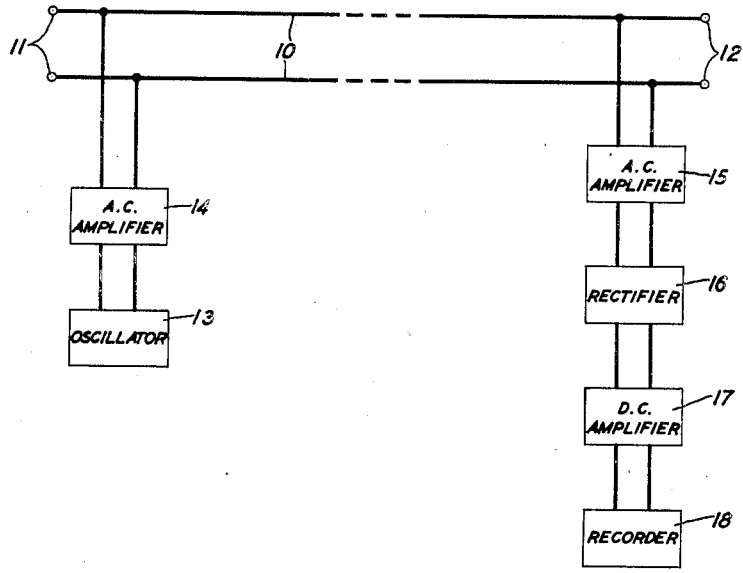
Figure 2:
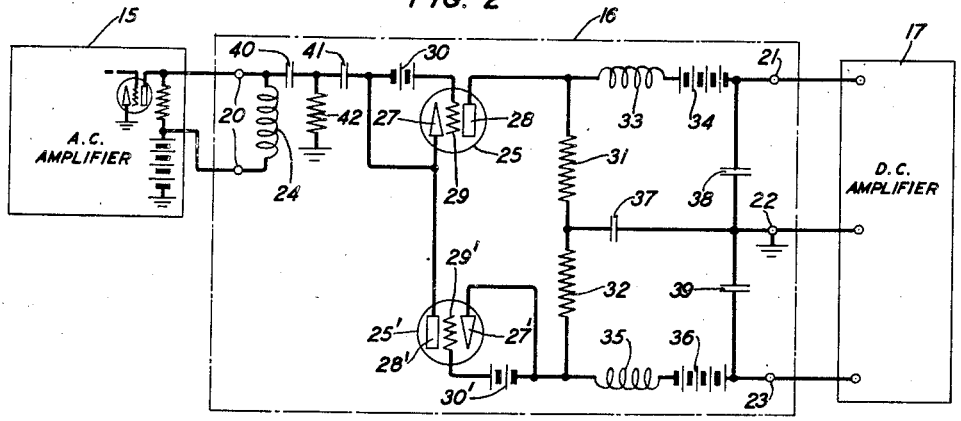

Other and further objects and features of the invention will be evident and a more complete understanding of the invention will be obtained from the detailed description which follows, taken in conjunction with the appended drawing, wherein:

Fig. 1 is a schematic of a transmission measurement system in which the rectifying system of this invention could be used; and Fig. 2 shows a rectifying system in accordance with the invention.

Fig. 1 shows schematically a rapid transmission-measurement recording arrangement. The transmission line 10 may be of considerable length, for example, its terminals 11 and its terminals 12 might be located at geographically separated points, for example, South Bend, Indiana and Toledo, Ohio. As is known, the transmission characteristics of the line will vary from day to day and during the day with variations in atmospheric conditions.

The transmission characteristics of the line may be automatically and periodically measured and recorded by suitably applying a testing signal at one end, i. e., at terminals 11, and suitably receiving it, i. e., at terminals 12, and making a record of its intensity, the record, preferably, being of the variation in the value of the testing signal at the receiving end from the normal or preassigned value.

At one end of the line, for example, at terminals 11, a source of testing signal may comprise the oscillator 13, whose output is applied to the line through an alternating current amplifier 14. The testing signal may be a single frequency, applied to the line at preassigned intervals; or, may be a number of frequencies in the band of frequencies intended to be transmitted over the line, the different frequencies being applied successively and for preassigned intervals, the entire group being repeated at preassigned intervals, the current supplied to the line being of constant value.

At the other end of the line, that is, at terminals 12, the testing signal is impressed on an alternating current amplifier 15, the output of which is delivered to the rectifier circuit 16 comprising this invention. The output of the rectifier is applied to the input terminals of a direct current amplifier 17, the output of which controls a recorder 18 which makes a permanent record of the intensity of the incoming test signal.

The receiving and recording equipment preferably detects and records the variation from the normal value of the current desired at the receiving end of the line. Hence, for a preassigned normal input to and output from the rectifier circuit 16, no effect will be desired from the direct current amplifier and the recorder. For variations from the normal test signal strength at the receiving end, the variations in the output of the rectifier should faithfully reflect the variations in the alternating current input to the rectifier and be as independent as possible of the characteristics of the tubes used in the rectifying circuit.

In Fig. 2, the rectifying circuit is shown in detail. It comprises input terminals 20 and output terminals 21, 22, 23. A choke coil 24 is connected across the terminals 20 to provide a low resistance path for the direct plate current of the last tube in the preceding amplifier. Blocking condensers 40, 41 and leak resistance 42 serve to couple alternating voltages from the amplifier to the rectifier and to prevent the flow of direct current. The use of two condensers with a leak resistance permits the elimination of extremely high leakage resistance requirements on the condensers. The rectifier tubes 25, 25' are electron discharge devices having cathodes 27, 27', anodes 28, 28' and control grids 29, 29'. The cathode and grid of each tube are tied together, with a biasing battery 30, 30' connected to the grid for biasing each grid to a positive potential. The tubes are connected together with the cathode 27 of one and the anode 28' of the other, connected to the condenser 41. Serially connected load resistances 31, 32 are connected across the output circuit of the tubes. A choke coil 33 and a battery 34 are connected in series between output terminal 21 and the upper end of the resistance 31, and a second choke coil 35 and a battery 36 are connected in series between the lower end of the resistance 32 and output terminal 23. A condenser 37 is connected between the common terminal of the load resistances and output terminal 22 which is connected to ground. This condenser provides a return path for currents flowing through condensers 40, 41 from the carrier amplifier. Condensers 38, 39, together with choke coils 33, 35 constitute a filter for the rectified output of the tubes.

A feature of the circuit described is that variation in the character of the tubes has relatively negligible effect on the overall performance of the circuit. This is accomplished by applying positive potential to the grids of the tubes so that the potential drop across the plate to cathode of the tube does not exceed a negligibly small voltage at the peak of the applied signal. The rectifier is seen to be of the voltage doubler type in which the alternating current signal is applied to the cathode of one tube and to the anode of the other in parallel. The output voltage is taken off across the resistances 31, 32 in series giving a direct voltage balanced to ground. Since no condensers, except the small capacity of the tubes and the choke coils, are connected across the resistances, the rectifier responds to the average applied voltage with the small variation due to the drop across the tubes.

In a particular rectifier in accordance with the invention, the tubes 25, 25' were Western Electric type 262A vacuum tubes. The grid of each tube was biased to a positive potential of 6 volts. The voltage supplied to the rectifier by the alternating current amplifier was approximately 90 volts peak, and the direct voltage appearing across each load resistance was approximately 30 volts. The peak voltage drop across the tubes did not exceed 3 volts at the instant that the voltage to be rectified was 90 volts. Appreciable variations, therefore, in the tube drop could occur and yet the variation in the efficient operation of the rectifier must be small.

The direct current amplifier to which the output of the rectifier was furnished was one of fairly high gain. It was necessary that the total output of the rectifier should be zero when a certain predetermined input was supplied by the alternating current amplifier, representing signal strength of normal value being received at the end of the line remote from the source of the signal, and should vary plus or minus when the input became greater or less than this input. The batteries 34, 36, therefore, are inserted and so poled that their voltage opposes that of the rectifier itself as developed across the resistances 31, 32. The batteries may be of equal voltage, although that is not necessary so long as their combined voltage is equal to the voltage drop across the load resistances for normal input to the rectifier circuit. In the particular case, each battery 34, 36 provided a normal potential of 30 volts to balance the normal 60 volts drop across the load resistances.

Although this invention has been disclosed with reference to a single embodiment thereof, it is not to be considered as limited thereto but only by the scope of the appended claims.

What is claimed is:

1. A rectifying system comprising an electron discharge device having a cathode, an anode and a control grid, an input circuit and an output circuit for said device, a load in said output circuit, means for biasing said control grid to such a positive potential that when potential to be rectified is applied to said input circuit, the voltage drop across the anode-cathode space is small compared to that across the load so that variations in the anode-cathode voltage have a negligible effect only on the load voltage, and means in the output circuit to neutralize the voltage developed across the load for an alternating current voltage of preassigned value applied to the input circuit.

2. A rectifying system comprising an electron discharge device having a cathode, an anode and a control grid, an input circuit and an output circuit for said device, a load in said output circuit, and means for biasing said control grid to such a positive potential that when potential to be rectified is applied to said input circuit, the voltage drop across the anode-cathode space is small compared to that across the load so that variations in the anode-cathode voltage have a negligible effect only on the load voltage, in which the voltage drop across the anode-cathode space and the rectified voltage drop are in the ratio of about one to ten, for peak input voltage.

3. A rectifying system comprising a pair of rectifier tubes each having a cathode, an anode and a control grid, the control grid and cathode in each being connected together and the cathode of one tube and the anode of the other tube being connected together, means for biasing the control grids to a positive potential, load resistances in the output circuit of each tube connected such that potentials developed thereacross are additive, means for impressing an alternating current potential on said tubes whereby potentials are developed across said resistances, means in the output circuits for neutralizing the effects of a potential of preassigned value developed across said resistances, and output terminals across which variations from such potential may be detected.

4. A rectifying system comprising an electron discharge device having a cathode, an anode and a control grid, a second discharge device having a cathode, an anode and a control grid, the cathode of said first device and the anode of said second device being connected together, an input circuit for applying an alternating current voltage to be rectified, an output circuit containing a load across which the rectified voltage is developed, means for biasing said control grids to such a positive potential that when the alternating current voltage is applied to the input circuit, the voltage drop across the anode-cathode space of each device will be small compared to that across the load, and means for neutralizing to a preassigned extent the voltage developed across said load, and terminal means across which the voltage difference between the load voltage and the neutralizing voltage may be detected.

5. In combination, a circuit having a normally constant alternating current output; a second circuit adapted normally to have no input thereto but operable in accordance with variations in the normally constant output of the first circuit; and a third circuit coupling said first and second circuits, said third circuit having the output of said first circuit applied to its input and comprising a rectifying electron discharge device having a cathode, an anode, and a control grid biased positive with respect to said cathode, means for neutralizing the rectified output of said device for the normally constant output of said first circuit, and means for applying to the input of the second circuit the potential difference resulting from variation in the rectified output because of variation in the normally constant output of the first circuit.

JAMES O. EDSON.